United States Patent [19]
Clark et al.

[11] Patent Number: 5,984,060
[45] Date of Patent: Nov. 16, 1999

[54] MONOTUBE STRUT ASSEMBLY

[75] Inventors: Michael David Clark, Bellbrook; Guy Raymond Tessier, Dayton, both of Ohio

[73] Assignee: General Motors Corporation, Detroit, Mich.

[21] Appl. No.: 08/917,258

[22] Filed: Aug. 25, 1997

[51] Int. Cl.[6] .................................................... F16F 9/32
[52] U.S. Cl. ............... 188/322.16; 188/269; 188/322.17; 188/322.19; 188/297; 267/64.15
[58] Field of Search ......................... 188/322.17, 322.16, 188/322.18, 321.11, 269, 315, 322.19, 297, 314, 322.22, 322.15, 322.13, 312, 317; 267/221, 64.26, 64.15, 129; 92/165 R, 166, 168; 280/124.125, 124.157, 124.147, 124.154, 124.146, 124, 124.25, 124.151, 124.158, 124.127, 6.159

[56] References Cited

U.S. PATENT DOCUMENTS

| | | | |
|---|---|---|---|
| 3,524,658 | 8/1970 | Carbon | 280/124 |
| 3,690,425 | 9/1972 | Willich et al. | 188/321 |
| 3,718,209 | 2/1973 | Moslo | 184/5 |
| 4,290,511 | 9/1981 | de Baan et al. | 188/322.17 |
| 4,452,436 | 6/1984 | Gute | 267/64.15 |
| 4,921,223 | 5/1990 | Fukumura et al. | 267/64.23 |

FOREIGN PATENT DOCUMENTS

| | | |
|---|---|---|
| 0011139 | 5/1980 | European Pat. Off. . |
| 95736 | 4/1971 | France . |
| 3301774 | 7/1984 | Germany . |

OTHER PUBLICATIONS

"McPherson et Jambes De Force une irresistible progression" Revue Technique Automobile, vol. 39, No. 443, Apr. 1984, pp. 99–111.

"Le momotube Mac Pherson sous haute protection", Revue Technique Automobile, vol. 48, No. 553, Jul. 1993–Aug. 1993, pp. xxx–xxxi.

Patent Abstracts of Japan vol. 095, No. 008, Sep. 29, 1995 & UP 97 139573 A (Toico Ltd), May 30, 1995.

*Primary Examiner*—Douglas C. Butler
*Attorney, Agent, or Firm*—Jeffrey A. Sedler; Robert M. Sigler

[57] ABSTRACT

A monotube strut assembly includes a housing tube with a piston assembly fixed relative to the housing tube by a piston rod. A damper body tube is reciprocally carried in the housing tube and is slidably engaged with the piston assembly. A bearing sleeve is fixed in position within the housing tube and seals are carried at both first and second ends of the bearing sleeve. A bearing is positioned adjacent each of the first and second ends of the bearing sleeve and the bearings slidably support the damper body tube. A quantity of oil is carried between the damper body tube and the bearing sleeve providing lubrication between the bearings and the damper body tube.

12 Claims, 6 Drawing Sheets

MONOTUBE STRUT ASSEMBLY

TECHNICAL FIELD

The present invention relates to a monotube strut assembly and more particularly, to a load-bearing damper of the monotube strut type for use in automotive McPherson strut suspension systems.

BACKGROUND OF THE INVENTION

A strut is a type of damper that is used in vehicle suspensions as both a damping device for providing shock absorbing functions and as part of the suspension's load-bearing structure. Monotube gas-charged dampers are conventionally known wherein a piston with a connected piston rod is slidably carried in a fluid-filled tube with a separate piston called a gas cup slidably carried in the tube on an opposite side of the piston from the rod. The gas cup separates a compressible gas charge from the fluid within the damper. It is known that monotube gas-charged dampers exhibit desirable performance characteristics when used in some suspension assemblies.

Typically, the generic monotube strut design configuration is produced primarily as an aftermarket replacement damper, although limited original equipment (OEM), applications have been implemented. The prior art device generally includes a bearing mechanism that includes a combination of a polytetrafluoroethylene laminated plain bearing and a grease lubricant. In some applications performance advantages of high pressure monotube dampers are well known and therefore, the use of such devices without restriction would be desirable. However, in applying a monotube gas-charged strut in an OEM application, extended durability requirements lead to restrictions in the use of such devices, particularly in applications involving larger and heavier vehicles that operate with resultant increased side loading. In general, such limitations are related to two fundamental requirements that must be achieved before a monotube strut can meet expected OEM frictional levels and durability goals. First, the bearings must be assembled and maintained in a straight and true fashion in order to obtain acceptable friction levels. Second, the bearing lubricant must be effective and must be supplied to the sliding tube and bearing interface continually during operation of the strut. Accordingly, problems in filling these requirements must be solved in applying a monotube strut to widespread use in OEM applications.

SUMMARY OF THE INVENTION

It is an aspect of the present invention to provide a monotube strut for use in automotive suspension systems that exhibits reduced friction and increased durability and performance. In general, a bearing system consisting of a separate bearing sleeve that carries twin bearings and seals and that is filled with liquid oil lubricant is employed. The selected oil lubricant is less viscous than the typically used grease lubricant and remains in contact with the reciprocating tube at all times, ensuring that a thin layer of lubricant is present continuously in the bearing/tube interface. The bearings and lubricant containing sleeve are slip-fit into a strut housing tube and are maintained in position. This arrangement provides a means of maintaining the bearings in a straight and true manner regardless of manufacturing operations that are performed on the housing assembly, and enables a build process that permits the use of seals and a liquid oil lubricant for the bearings.

In particular, a monotube strut assembly according to the aforementioned aspect includes a housing tube with a piston assembly fixed relative to the housing tube by a piston rod. A damper body tube is reciprocally carried in the housing tube and is slidably engaged with the piston assembly. A bearing sleeve is fixed in position within the housing tube and seals are carried at both first and second ends of the bearing sleeve. A bearing is positioned adjacent each of the first and second ends of the bearing sleeve and the bearings slidably support the damper body tube. A quantity of oil is carried between the damper body tube and the bearing sleeve providing lubrication between the bearings and the damper body tube. It is the intent of this design to offer advantages for both product performance, durability and to include features facilitating design for assembly.

DESCRIPTION OF THE PREFERRED EMBODIMENT

Figure 1:
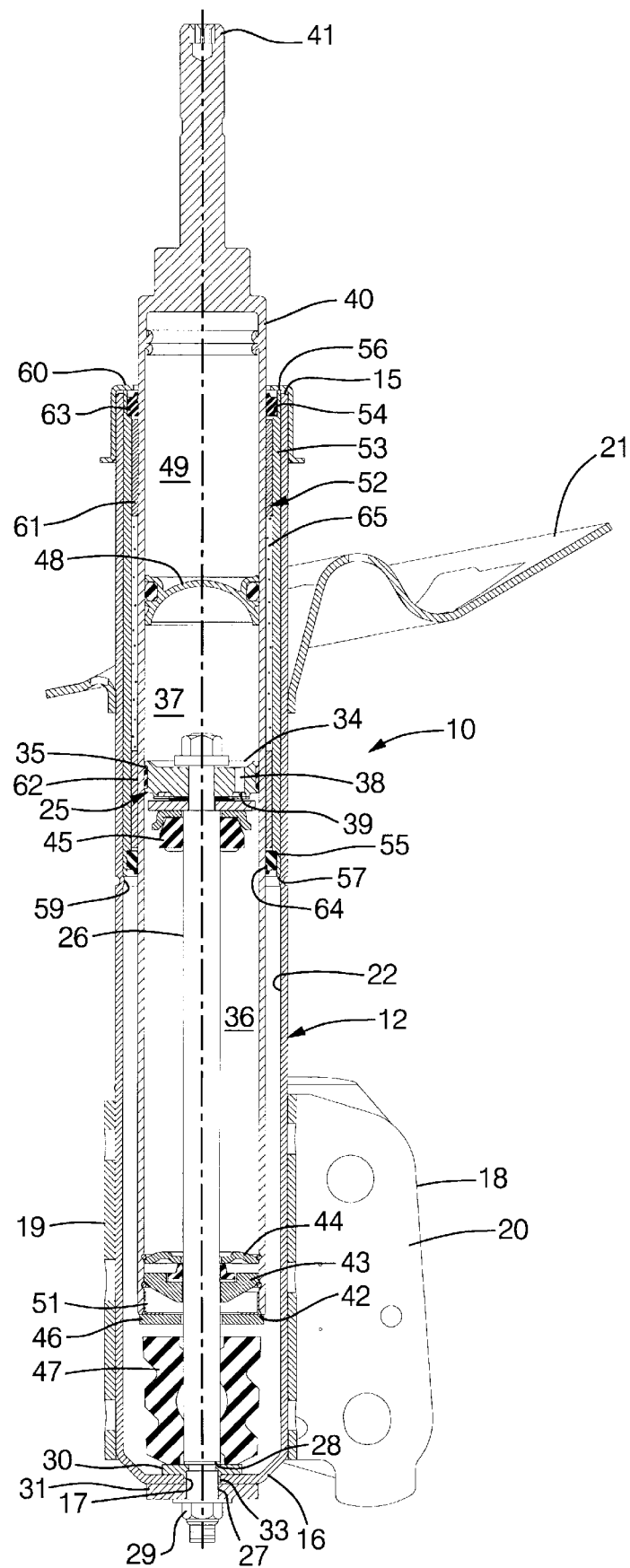
FIG. 1 is a cross-sectional illustration of a monotube strut according to the present invention.
Figure 5:
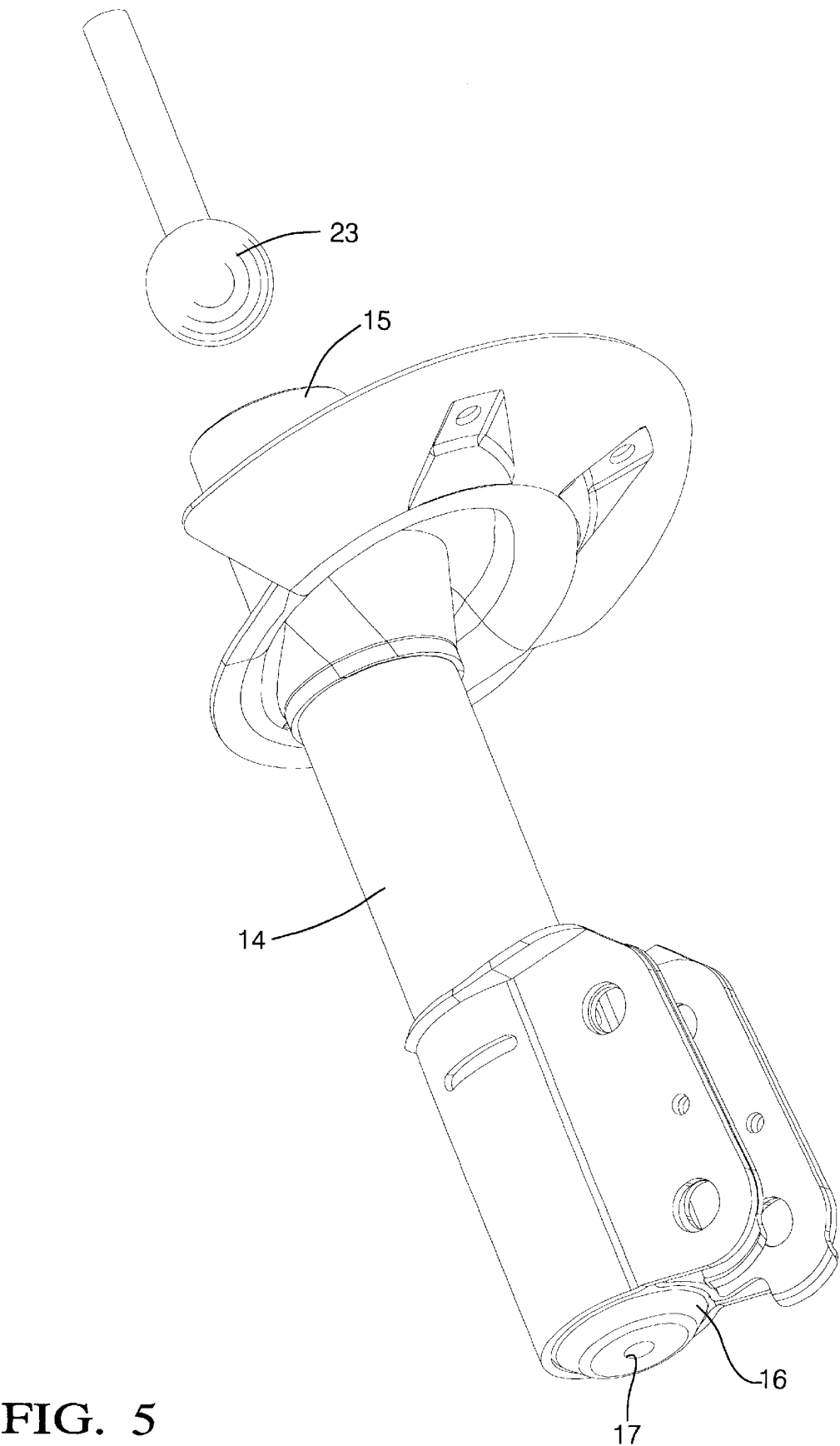
FIG. 5 is a perspective illustration of a subassembly of the monotube strut of FIG. 1 showing assembly details.

Referring to the drawings, illustrated in FIG. 1 is a monotube gas-charged suspension strut designated as an assembly at 10. In general the strut 10 is designed for operation as a load-bearing and shock-absorbing device within a vehicle suspension, and is connected between the sprung (body) and unsprung (wheel assembly) masses. Strut 10 comprises a housing 12 that includes a housing tube 14 with an open end 15 and a closed end 16 that may be formed by a spin closing operation, or by welding or otherwise securing a secondary component to the housing tube 14. The closed end 16 includes an opening 17. A mounting bracket 18 includes a cylindrical body 19 that is closely received over the housing tube 14 near closed end 16 and is secured in position by a suitable means such as welding. The bracket assembly 18 also has a pair of arms 20 that exhibit suitable openings for connection to the unsprung mass of the vehicle at a location such as the steering knuckle (not illustrated). A spring seat 21 is also received on the housing tube 14 and is located in position as required by the particular application within which the strut 10 will operate. The spring seat 21 is fixed in position on the housing tube 14 by a suitable means such as welding. The assembly process of the housing tube 14 including the operations of welding the mounting bracket 18 and spring seat 21 result in a structure that is not particularly well suited for direct insertion of the remaining components of the strut 10. Accordingly, a subsequent operation is performed to align the inside wall 22 of the housing tube 14 and is illustrated in FIG. 5. In this sizing operation, the housing tube 14 is mounted into a fixture (not illustrated) and is clamped in position. A ball sizing arbor 23 is driven into the open end 15 of the housing tube 14 and is then removed, providing a re-sizing operation to correct for possible tube distortion in the weld regions on the housing tube 14. Using the inner diameter of the housing tube 14 as a datum, the round hole 17 is pierced in the closed end 16 of the housing tube 14, enabling the proper centered alignment of the damper piston rod 26 attachment point relative to the bore of housing tube 14.

Referring again to FIG. 1, a piston assembly 25 is connected to a piston rod 26 and is fixed in position within the housing tube 14. The piston rod 26 extends through the opening 17 with a reduced diameter segment 27 of the piston rod 16 captured within the opening 17 between shoulder 28 and flanged nut 29. A pair of support plates 30 and 31 are positioned on opposite sides of the closed end 16 with the support plate 30 bearing against the shoulder 28 and the support plate 31 bearing against the flange of nut 29. The support plate 30 includes an annular extension 31 that extends into the opening 17 and around the reduced diameter segment 27.

The piston assembly 25 includes a sintered steel piston body 34 that carries a band of low friction material 35 for engaging the damper body tube 40. This provides a mechanism for fluid separation between extension chamber 36 and compression chamber 37. A number of openings 38 are provided in the piston body 34, which are normally closed by a monodisc valve assembly 39. The openings 38 provide a fluid route between the extension chamber 36 and the compression chamber 37 when a sufficient force is established to deflect the valve assembly 39. As fluid flow is forced through the openings 38, the valve assembly 39 effects a selected pressure drop across the piston and a subsequent back pressure. Through this mechanism the strut 10 provides a selected damping response between the sprung and unsprung masses of the vehicle.

The strut 10 further includes a damper body tube 40 that is slidingly received over the piston assembly 25. Damper body tube 40 includes a first end 41 at an outboard position adapted to be connected to the sprung mass of the vehicle and includes a second end 42 at an inboard position. The end 42 is supported about the piston rod 26 by a rod guide assembly 43 that is fixed in position within the damper body tube 40. A flask 44 is positioned against the rod guide assembly 43 and is fixed in the damper body tube 40. Flask 44 is adapted to contact a rebound stop that comprises an elastomeric bushing 45 carried adjacent the piston assembly 25. At maximum extension of the strut 10, the bushing 45 is compressed against the flask 44 to cushion the deceleration of strut 10. A plate 46 is carried near the rod guide assembly 43 by a bracket 51 that slips inside the end 42 of damper body tube 40. The plate 46 is adapted to contact a jounce bumper 47 that comprises an elastomeric bushing and that is positioned against the support 30 at the closed end 16 of housing tube 14 and about the piston rod 26.

A gas cup 48 is also carried in the damper body tube 40 between the piston assembly 25 and the end 41. The gas cup 48 carries a seal and slides along the inside of damper body tube 40 separating out a compensation chamber 49 from the compression chamber 37. While the extension chamber 36 and compression chamber 37 carry a supply of hydraulic fluid, the compensation chamber 49 carries a compressible nitrogen gas supply. During extension and compression directed travel of the damper body tube 40 relative to the piston assembly 25, a decreasing or an increasing volume of the piston rod 26 is contained within the damper body tube 40 depending on the stroke position of the strut assembly 10. In order to compensate for this varying volumetric amount of the piston rod 26 within the fluid-filled chambers 36 and 37, the gas cup 48 slides compressing or expanding the compensation chamber 49.

Figure 6:
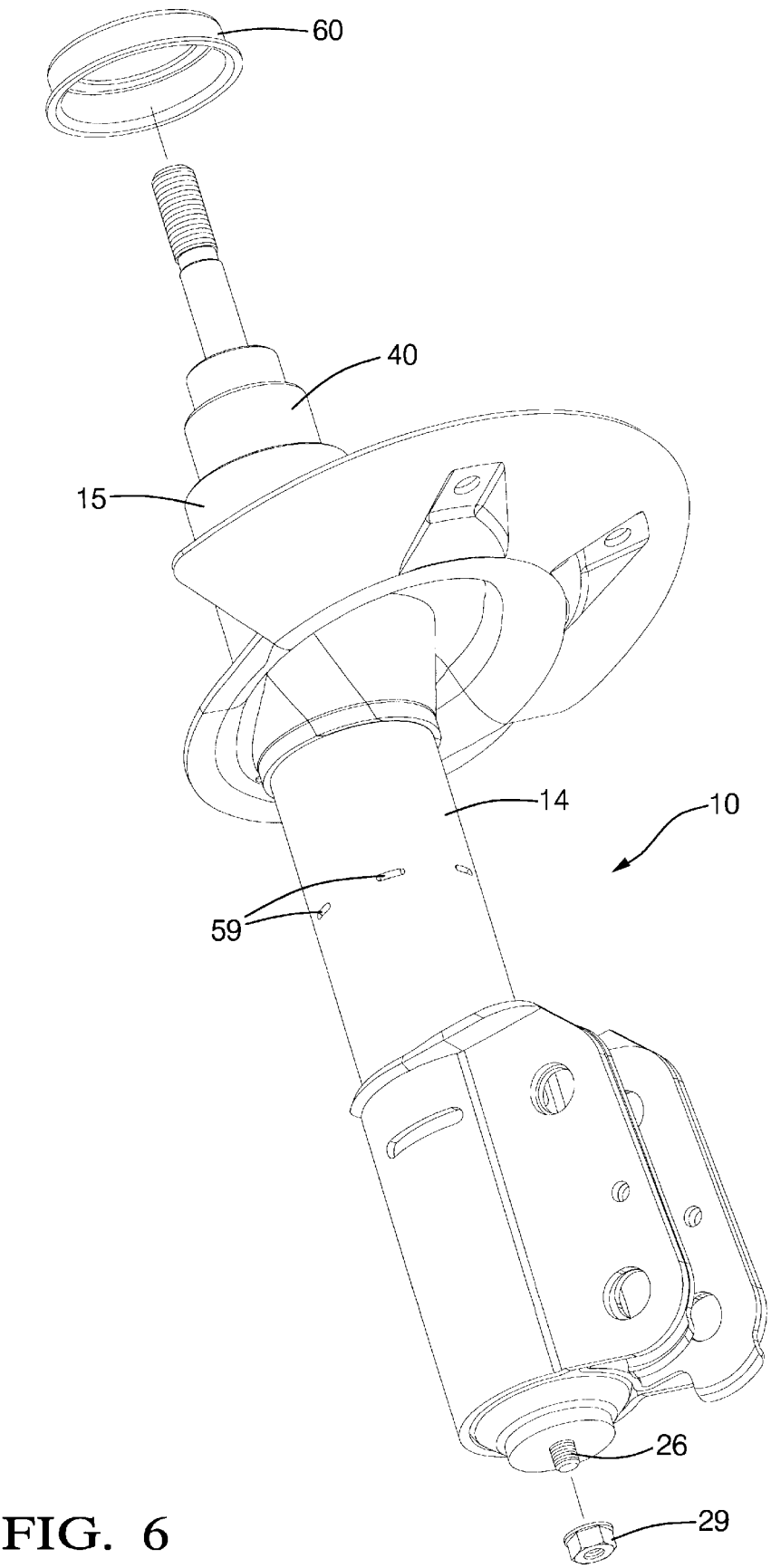
FIG. 6 is a perspective illustration of a subassembly of the monotube strut of FIG. 1 showing assembly details.

The predominate means of supporting the damper body tube 40 within the reservoir tube 14 is provided by a bearing system 52 that is designed to reduce friction and improve durability of the strut 10. The bearing system 52 includes a bearing sleeve 53 that is made of common steel in the present embodiment, and which includes a step 54 formed near its outboard end 56 and a step 55 formed near its outboard end 57. The bearing sleeve 53 is slip-fit within the housing tube 14 near end 15. Bearing sleeve 53 is maintained in position by a formed stop 59 at end 57, and by a retaining cap 60 at end 56 that is pressed onto the end of housing tube 14. The stop 59 is formed by a means such as roll-forming or dimpling and is illustrated as a series of dimples as shown in FIG. 6.

The bearing assembly 52 also includes a pair of plain bearings 61 and 62 that are pressed into the bearing sleeve 53 with the bearing 61 positioned near end 56 and the bearing 62 positioned near end 57. A seal 63 is positioned against the step 54 and bears against the damper body tube 40. A seal 64 is positioned against the step 55 and bears against the damper body tube 40. This provides a fluid-tight chamber 65 between the bearings 61 and 62 which is filled with oil. The oil in chamber 65 is in a fluid form at room temperature and is preferably comprised of a formulated synthetic hydrocarbon based polyalphaolefinic bearing oil. This preferred oil is selected because it provides the film strength of a natural paraffinic petroleum oil with improved performance in the areas of volatility, temperature, operating range, and viscosity stability.

Figure 2:
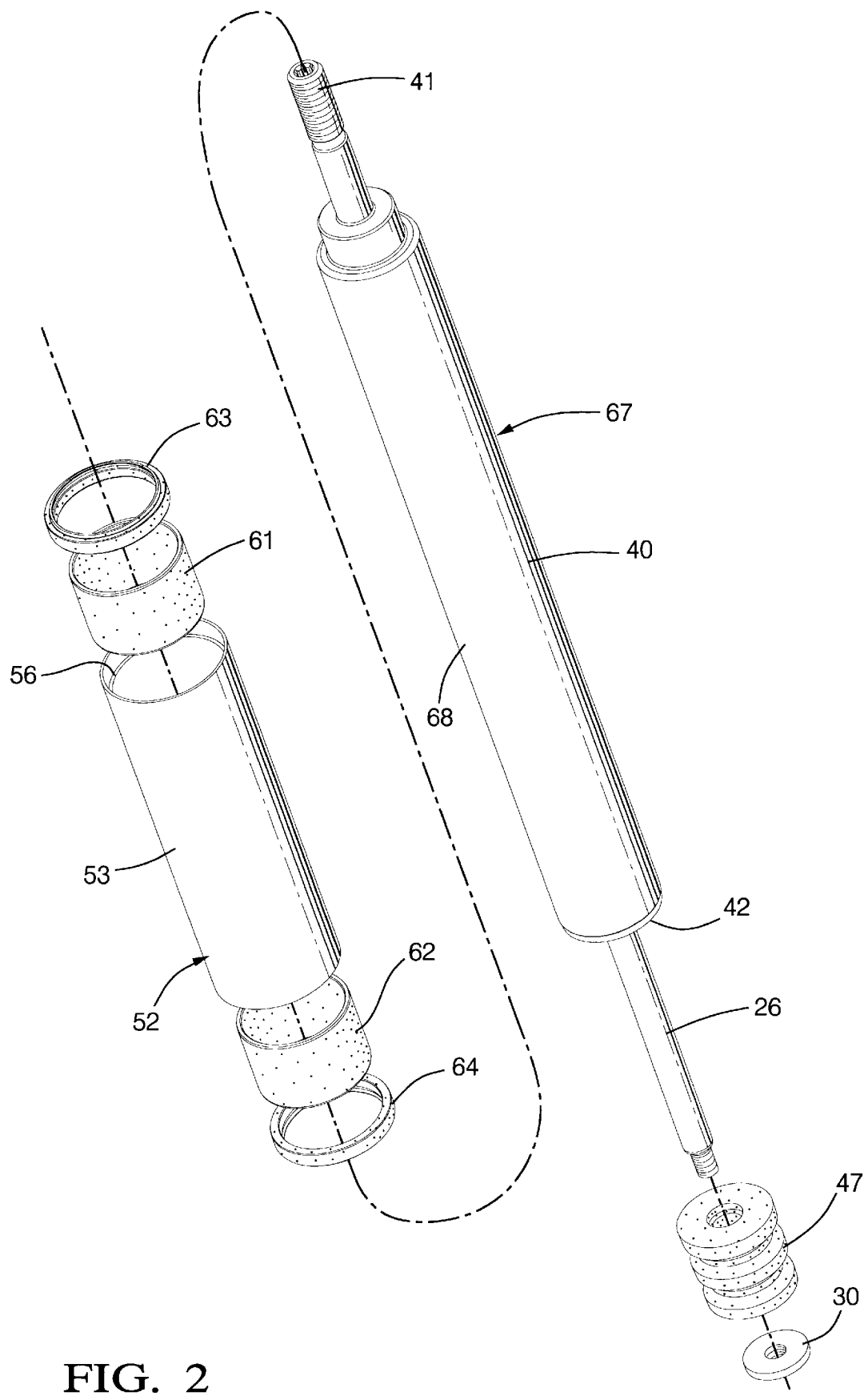
FIG. 2 is a perspective partially exploded illustration of components of the monotube strut shown in FIG. 1.

Referring to FIG. 2, assembly of the bearing assembly 52 with the damper subassembly 67 is illustrated. Initially, the damper body tube 40 is assembled with the piston assembly 25, rod guide assembly 43 and piston rod 26 to form the damper subassembly 67. The exterior surface 68 of damper body tube 40 is chrome-plated, or equivalently treated, for improved corrosion and abrasion resistance and surface finish. The bearing sleeve 53 is assembled with the bearings 61 and 62, and the seals 63 and 64. Subsequently, bearing sleeve 53 is slidingly received over the damper body tube 40. Additionally, the jounce bumper 37 and support 30 are received over the piston rod 26.

Figure 3:
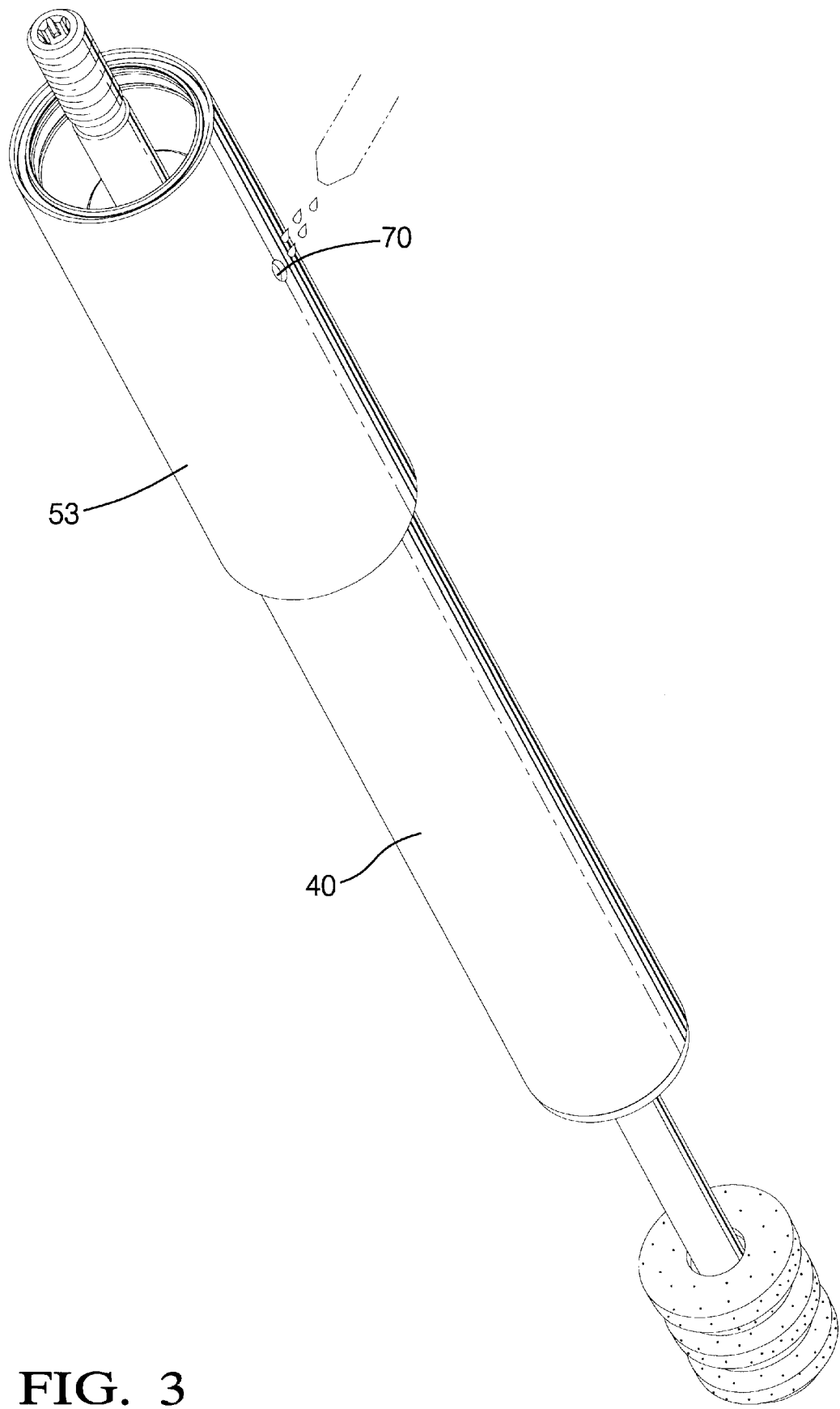
FIG. 3 is a perspective illustration of a subassembly of the monotube damper of FIG. 1.
Figure 4:
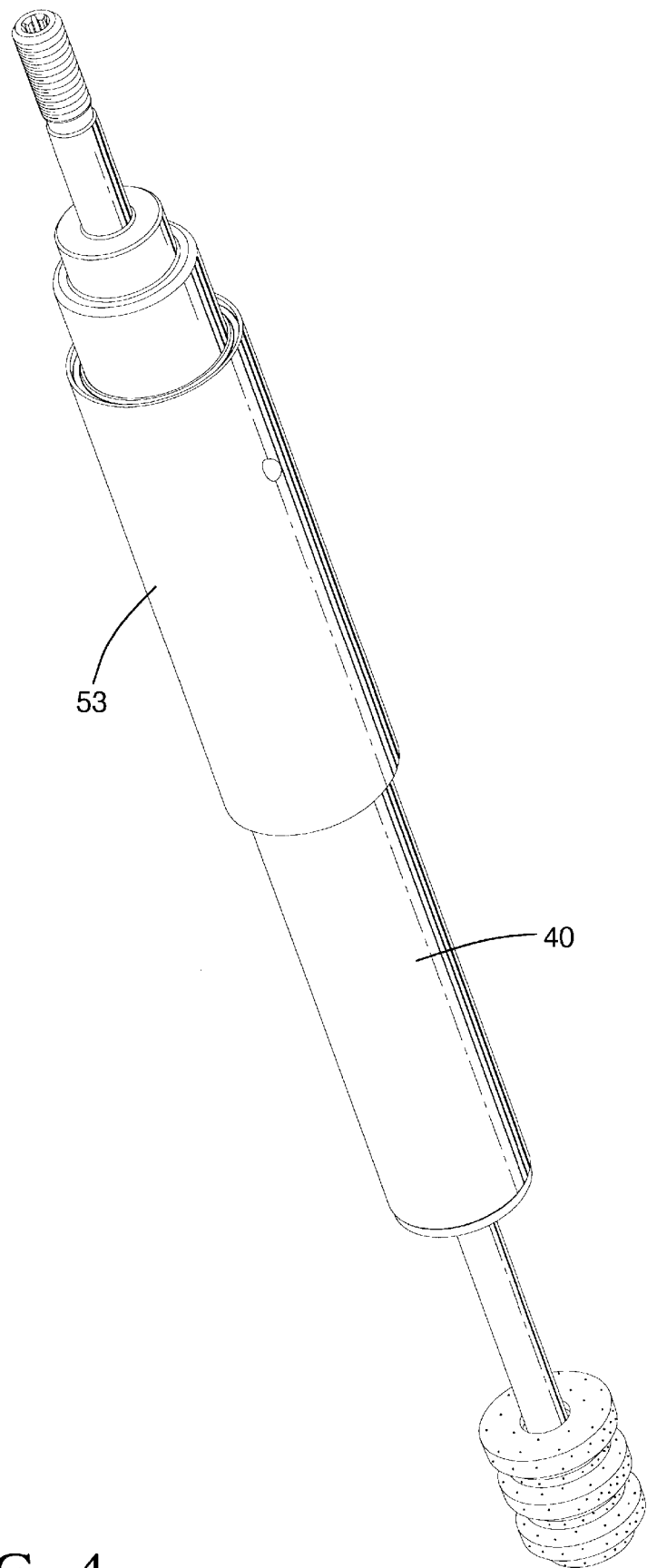
FIG. 4 is a perspective illustration of a subassembly of the monotube strut of FIG. 1 showing assembly details.

Referring to FIG. 3, with the bearing sleeve 53 in position on the damper body tube 40, the oil is introduced into the chamber 65 through a fill opening 70. Subsequently, the opening 70 is sealed closed through means such as a ball plug, as shown in FIG. 4, and the unit is ready for assembly into the housing tube 14. Referring to FIG. 6, the damper body tube 40 and bearing sleeve 53 are assembled into the housing tube 14 and a nut 29 secures the piston rod 26 in position. The retaining cap 60 is positioned on the end 15 of housing tube 14 and assembly of the unit is complete. This design enables a build process that allows the oil lubricant and the necessary seals to be installed as part of the strut 10. This also enables utilizing the same damper design subassembly 67 in other applications such as those involving twin-tube strut assemblies. Advantageously, component part proliferation is reduced over a range of products. Improved heat dissipation is obtained by the large metal-to-metal contact provided through the bearing sleeve 53 and the bearings 61, 62, and by improved heat transfer via the fluid contained in bearing sleeve 53, to the housing tube 14.

During operation of the strut 10 as the damper body tube 40 is extended from, and retracted into the housing tube 14, lateral support is provided by the rod guide assembly 43, the piston assembly 25, and primarily by the bearing assembly 52. Alignment of the bearings 61, 62 is established by the bearing sleeve 53. Low friction operation is established through hydrodynamic lubrication of the mating surfaces between the damper body tube 40 and the bearings 61 and 62 by the oil carried in chamber 65. The seals 63 and 64 prevent the migration of the oil in the chamber 65 from outside the contained area within the bearing sleeve 53. The elements provide a strut 10 that is operable over an extended range, and capable of maintaining acceptable friction levels, suitable for use in OEM applications including those involving relatively heavy loading requirements that are placed upon the load-bearing strut 10.

We claim:

1. A monotube strut assembly comprising:

a housing tube;

a piston assembly fixed in position relative to the housing tube by a piston rod;

a damper body tube reciprocally carried in the housing tube and slidably engaging the piston assembly;

a bearing sleeve fixed in position entirely within the housing tube with a seal carried at each of a first end and a second end of the bearing sleeve entirely within the bearing sleeve;

a bearing positioned adjacent each of the first and second ends of the bearing sleeve and slidably supporting the damper body tube; and a quantity of oil carried between the damper body tube and the bearing sleeve, the oil being retained in the bearing sleeve by the seals at the first and second ends thereof.

2. A monotube strut assembly according to claim 1 wherein the housing tube defines a bore having an open end with a stop formed from material of the housing tube within the bore and wherein the open end is closed by a retaining cap so that the bearing sleeve is captured between the retaining cap and the stop.

3. A monotube strut assembly according to claim 2 wherein the damper body tube slides within the bearings so that mating surfaces of the damper body tube and the bearings move relative to each other and wherein low friction operation is established through hydrodynamic lubrication of the mating surfaces by the quantity of oil.

4. A monotube strut assembly according to claim 3 wherein the mating surface of the damper body tube is chrome plated.

5. A monotube strut assembly according to claim 4 wherein the mating surfaces are relatively large so that the lateral support of the damper body tube is provided primarily by the bearings and wherein efficient heat dissipation is established by heat transfer through the quantity of oil, the bearing sleeve and the bearings to the housing tube.

6. A monotube strut assembly that operates as a damper and as a load bearing device comprising:

a cylindrical housing tube having a closed end with an opening and having an open end, with a mounting bracket attached to the housing tube near the closed end and a spring seat attached to the housing tube between the closed end and the open end, and wherein the housing tube defines a bore between the closed end and the open end with a stop formed from material of the housing tube within the bore;

a retaining cap closing the open end of the housing tube;

a piston assembly fixed in position relative to the housing tube by a piston rod that extends through the opening of the closed end and is fixed therein;

a damper body tube having an inboard end and an outboard end and reciprocally carried in the housing tube and slidably engaging the piston assembly;

a rod guide assembly positioned in the inboard end of the damper body tube and engaging the piston rod;

a bearing sleeve positioned within the housing tube and between the retaining cap and the stop with a seal carried at each of a first end and a second end of the bearing sleeve;

a bearing positioned adjacent each of the first and second ends of the bearing sleeve and slidably supporting the damper body tube, wherein the damper body tube is laterally supported within the housing tube by the piston, the rod guide and primarily by the bearings; and a quantity of oil carried between the damper body tube and the bearing sleeve wherein the quantity of oil provides hydrodynamic lubrication of mating surfaces of the damper body tube and the bearings.

7. A monotube damper assembly according to claim 6 further comprising a plate carried at the inboard end of the damper body tube by a bracket that slips inside the damper body tube.

8. A monotube damper assembly according to claim 7 further comprising a support plate positioned against the closed end of the housing tube and including an annular extension that extends into the opening in the closed end and is positioned around the piston rod.

9. A monotube damper assembly according to claim 8 wherein the bearing sleeve includes a step at each of the first and second ends wherein the seals are carried in the steps.

10. A monotube damper assembly according to claim 9 wherein the bearing sleeve is slip fit within the housing tube and is fixed in position by the retaining cap and the stop.

11. A monotube damper assembly according to claim 10 wherein the stop comprises a series of dimples formed around the housing tube.

12. A monotube strut assembly that operates as a damper and as a load bearing device comprising:

a cylindrical housing tube having a closed end with an opening and having an open end, wherein the housing tube defines a bore between the closed end and the open end with a stop formed from material of the housing tube within the bore, with a mounting bracket attached to the housing tube near the closed end and a spring seat welded to the housing tube between the closed end and the open end, wherein the housing tube is fabricated by a process that includes the step of re-sizing the bore to correct for tube distortions caused by welding the spring seat to the housing tube;

a retaining cap closing the open end of the housing tube;

a piston assembly fixed in position relative to the housing tube by a piston rod that extends through the opening of the closed end and is fixed therein;

a damper body tube having an outer surface that is chrome plated, an inboard end and an outboard end and reciprocally carried in the housing tube and slidably engaging the piston assembly;

a rod guide assembly positioned in the inboard end of the damper body tube and engaging the piston rod;

a bearing sleeve positioned within the housing tube and between the retaining cap and the stop with a seal carried at each of a first end and a second end of the bearing sleeve wherein the bearing sleeve is slip fit within the bore of the housing tube and is fixed in position by the retaining cap and the stop;

a bearing positioned adjacent each of the first and second ends of the bearing sleeve and slidably supporting the damper body tube, wherein the damper body tube is laterally supported within the housing tube by the piston, the rod guide and primarily by the bearings; and a quantity of oil carried between the damper body tube and the bearing sleeve wherein the quantity of oil provides hydrodynamic lubrication of mating surfaces of the damper body tube and the bearings and wherein efficient heat dissipation is established by heat transfer through the quantity of oil, the bearing sleeve and the bearings to the housing tube.

\* \* \* \* \*